United States Patent [19]
DeLeon

[11] Patent Number: 6,108,855
[45] Date of Patent: Aug. 29, 2000

[54] HAND TOWEL

[76] Inventor: Yvonne DeLeon, 20306 SW. 85 Ave., Miami, Fla. 33189

[21] Appl. No.: 09/309,898

[22] Filed: May 11, 1999

[51] Int. Cl.[7] ........................................... A47L 13/16
[52] U.S. Cl. .............................. 15/209.1; 15/208; D6/609
[58] Field of Search ................... 15/208, 209.1, 15/210.1; D6/608, 609

[56] References Cited

U.S. PATENT DOCUMENTS

| | | |
|---|---|---|
| D. 339,951 | 10/1993 | Parkison et al. . |
| D. 347,542 | 6/1994 | Sheppard, Jr. . |
| D. 377,131 | 1/1997 | Davis . |
| D. 380,119 | 6/1997 | Gonzaalez . |
| D. 390,403 | 2/1998 | Pirraglia et al. . |
| D. 398,805 | 9/1998 | Sigmon . |
| 1,681,031 | 8/1928 | Forbis ........................ 15/208 |
| 2,233,746 | 3/1941 | Potter ........................ 15/209.1 |
| 2,803,845 | 8/1957 | Bradford . |
| 2,932,839 | 4/1960 | Flanigan .................... 15/209.1 |
| 3,040,357 | 6/1962 | Belleni ...................... 15/209.1 |
| 4,224,712 | 9/1980 | Black et al. . |
| 4,303,187 | 12/1981 | Berman . |
| 4,437,253 | 3/1984 | Kinnear . |
| 5,147,703 | 9/1992 | Provost et al. ............. 15/209.1 |
| 5,372,414 | 12/1994 | Lamonakis et al. . |
| 5,771,523 | 6/1998 | Rudolph ..................... 15/209.1 |
| 5,797,142 | 8/1998 | Debronsky et al. . |
| 5,813,080 | 9/1998 | Hendren ..................... 15/209.1 |

Primary Examiner—Terrence R. Till
Attorney, Agent, or Firm—Richard C. Litman

[57] ABSTRACT

A hand towel adapted for attachment to users's body, as by attachment to a belt worn about the waist, or to a stanchion, railing, pipe, or other support as is commonly found on fishing boats. The towel is made from two layers of terry cloth cut into the shape of a fish, the edge of each layer being doubled over and the edge of one layer being joined to the edge of the other layer by sewing a seam about the border of the fish. The towel has loop made from an elastic strap or band. The loop has two free ends which may be releasably fastened together in order to attach the towel to a belt of other support. The loop preferably has an adjustment mechanism for adjusting the diameter of the loop. In a first embodiment, the loop has an end sewn into the border of the towel. In a second embodiment, the towel has a grommet defining an eye of the fish, the loop being inserted through the grommet. In the second embodiment, a metal ring having a resilient, flexible tang may be substituted for the elastic loop.

11 Claims, 5 Drawing Sheets

HAND TOWEL

BACKGROUND OF THE INVENTION

1. Field of the Invention

The present invention relates to hand towels, and particularly to a fish-shaped hand towel useful for sports fishermen, or for restaurant personnel in the seafood industry.

2. Description of the Related Art

Sports fishermen have occasion to get their hands soiled or wet while handling bait or when reeling in their catch. It is frequently inconvenient to interrupt their fishing activities to go to a storage locker to retrieve a towel to wipe their hands on. Consequently, the fisherman faces the choice of wiping his soiled or wet hands on his clothing, or waiting for the moisture to evaporate. There is, therefore, a need for a hand towel which is readily available to the fisherman about his person or at hand on his boat for quickly wiping water and dirt from his hands.

Similarly, restaurant personnel, particularly waitresses, bartenders, busboys, etc. in seafood establishments, find that their hands become contaminated with liquids, grease, and assorted food products. In food service establishments it is particularly a matter of concern to maintain clean hands. It would be desirable to have a hand towel readily available about the person of such food establishment employees which would permit their hands to be kept free for carrying dishes, plates, and other eating utensils, while blending in with the motif and ambiance of the establishment.

Various improvements in towels generally, and hand towels in particular, have been the subject of prior patents. U.S. Design Pat. No. 339,951, issued Oct. 5, 1993 to Parkinson et al., shows a towel with a pocket having a continuous loop of fixed diameter attached at one corner of the towel. U.S. Design Pat. No. 347,542, issued Jun. 7, 1994 to J. M. Sheppard, Jr., shows a towel with a continuous loop strap hold the base of a snap hook fastener. U.S. Design Pat. No. 377,131, issued Jan. 7, 1997 to R. E. Davis, shows a sportsman's towel having an inside pocket and a horizontally oriented continuous loop for attaching the towel about the sportsman's waist.

U.S. Design Pat. No. 380,119, issued Jun. 24, 1997 to R. E. Gonzalez, shows an exercise towel having a paddle shape and a pocket. U.S. Design Pat. No. 390,403, issued Feb. 10, 1998 to Pirraglia et al., shows a bath towel in the shape of an angel. U.S. Design Pat. No. 398,805, issued Sep. 29, 1998 to P. H. Sigmon, shows a towel with an edge folded over to form an elongated loop for hanging from a belt.

U.S. Pat. No. 4,224,712, issued Sep. 30, 1980 to Black et al. describes a towel which may be hung from the waistband which is formed from a main body and three equally spaced tabs along the top edge of the main body, the towel being folded to form a pleat, the side tabs being folded behind the center tab in overlapping fashion and sewn together. The tab may be tucked inside the waistband.

U.S. Pat. No. 4,303,187, issued Dec. 1, 1981 to C. Berman, discloses an accessory to be worn with tight jeans, which includes a base panel with multiple pockets having spaced apart belt loops which close by snap fasteners along the top edge of the panel, and a tie string extending through a loop at the bottom of the panel for fastening around the thigh. The tie string may be replaced by a flexible band fastened either with snaps, or with hook and loop fasteners.

U.S. Pat. No. 4,437,253, issued Mar. 20, 1984 to D. W. Kinnear, teaches a towel for fishermen prepared by impregnating a towel with anise extract. The fisherman wipes his hands on the towel before handling bait. The odor of the anise extract masks the human odor on the bait.

U.S. Pat. No. 5,372,414, issued Dec. 13, 1994 to Lamonakis et al., shows a towel holder made from a water repellant fabric having a bell shape to cover towels and protect them from moisture from rain or snow until use. The holder is doubled over the ring portion of a shower curtain ring and secured by a grommet placed through the center of the ring and the two layers of the holder. The towels are also shown having a grommet attached to the projecting portion of the ring.

None of the above inventions and patents, taken either singularly or in combination, is seen to describe the instant invention as claimed. Thus a hand towel solving the aforementioned problems is desired.

SUMMARY OF THE INVENTION

The hand towel adapted for attachment to a users's body, such as by attachment to a belt worn about the waist, or to a stanchion, railing, pipe, or other support as is commonly found on fishing boats. The towel is made from two layers of terry cloth cut into the shape of a fish, the edge of each layer being doubled over and the edge of one layer being joined to the edge of the other layer by sewing a seam about the border of the fish. The towel has loop made from an elastic strap or band. The loop has two free ends which may be releasably fastened together in order to attach the towel to a belt of other support. The loop preferably has an adjustment mechanism for adjusting the diameter of the loop. In a first embodiment, the loop has an end sewn into the border of the towel. In a second embodiment, the towel has a grommet defining an eye of the fish, the loop being inserted through the grommet. In the second embodiment, a metal ring having a resilient, flexible tang may be substituted for the elastic loop.

Accordingly, it is a principal object of the invention to provide a hand towel which is adapted for attachment to the body of the user, or to a pipe, rod, or other support fixture conveniently accessible to the user by a loop with a releasable fastener.

It is another object of the invention to provide a hand towel which has a loop for attachment to a belt, rail, or other support which is made from a flexible, resilient material so that the towel may withstand the stress of tensile forces applied to the loop.

It is a further object of the invention to provide a hand towel which has a loop for connection to a belt, rail, or other support in which the size of the loop is adjustable to accommodate supports of different dimensions.

Still another object of the invention is to provide a hand towel which has means for connection to a belt, rail, or other support and which also has a double layer of toweling for additional thickness and absorbency in an attractive, ornamental shape.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
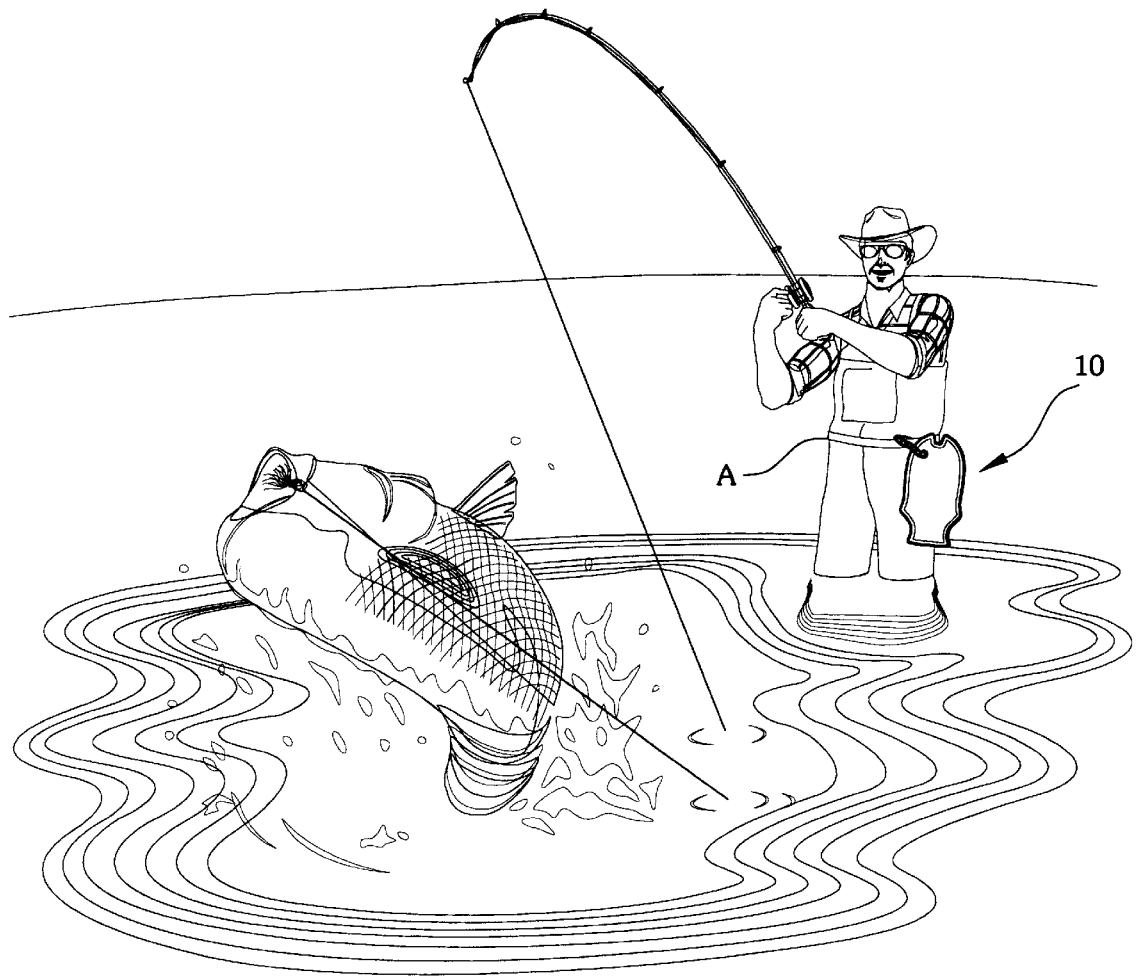
FIG. 1 is an environmental, perspective view of a hand towel according to the present invention.

The present invention is a hand towel, designated generally as 10 in the drawings. As shown in FIG. 1, the hand towel 10 may be suspended from the user's belt A, or it may be suspended from a railing or other support. Although shown attached to a belt A, it will be understood that the hand towel 10 may be attached to some other portion of the user's clothing, such as overall straps, wader straps, etc., or to an article carried by the user, such as a creel, or generally attached to the user's person.

Figure 2:
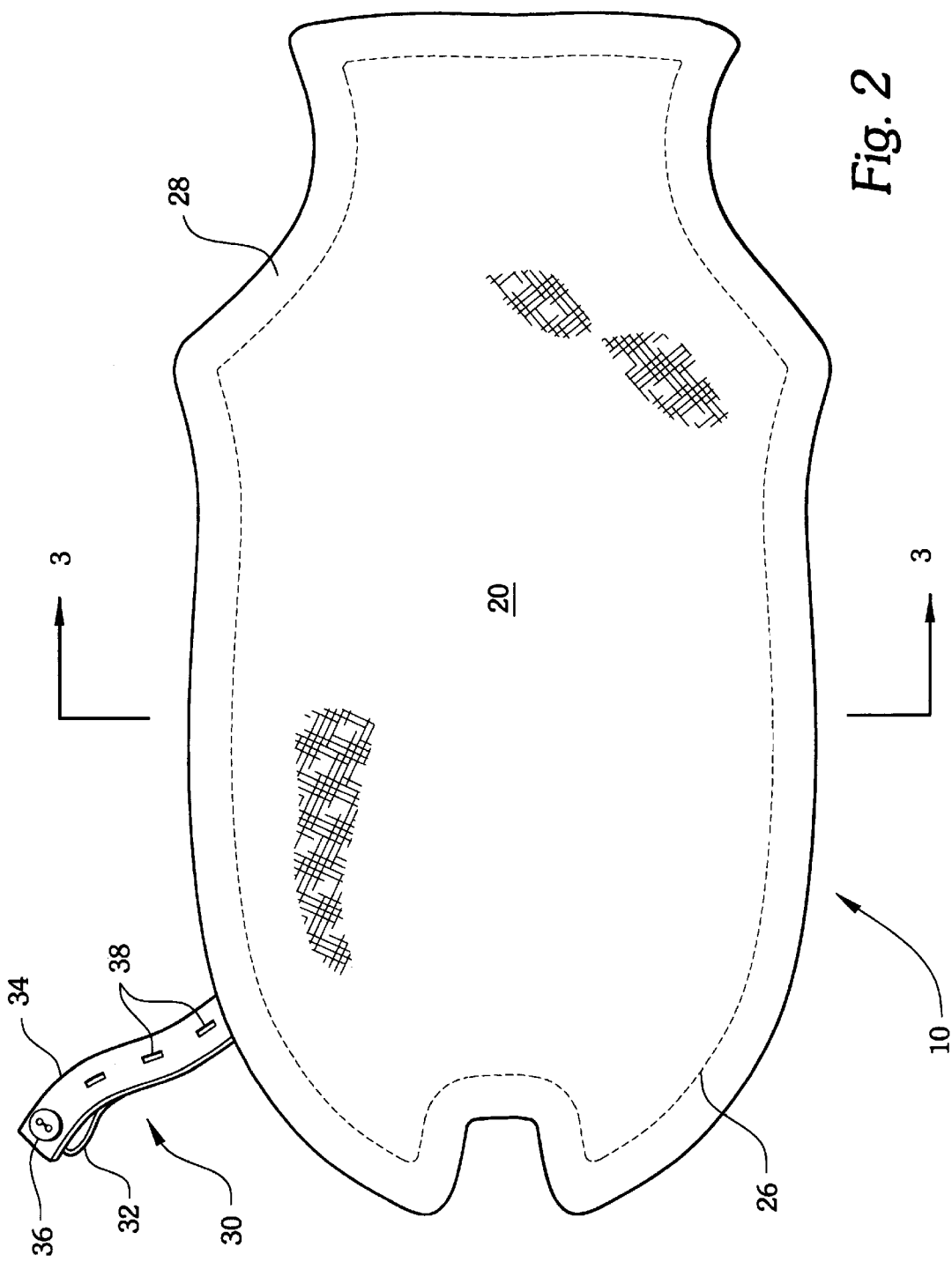
FIG. 2 is a side view of a hand towel according to the present invention.
Figure 3:
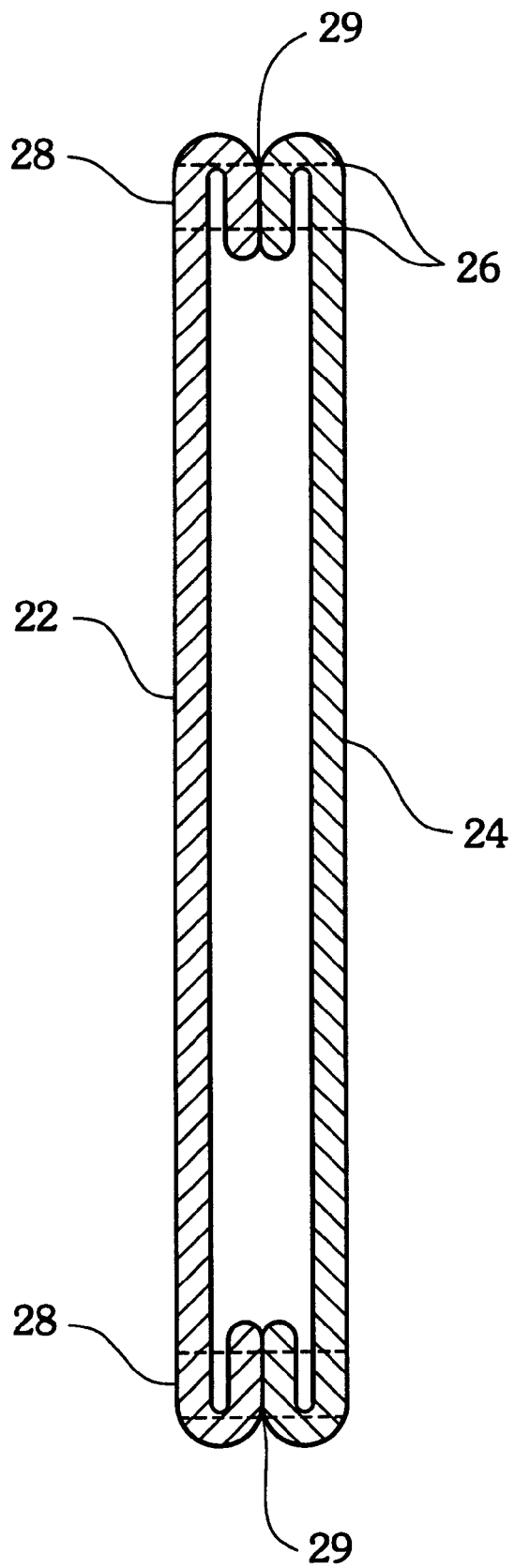
FIG. 3 is a section view drawn along line 3—3 of FIG. 2.

As shown more particularly in FIGS. 2 and 3, the hand towel 10 includes a body 20 and a loop 30. The body 20 is made from a first 22 and second 24 layer of flat, flexible cloth toweling, preferably terry cloth made from 100% cotton or other toweling material. The two layers 22, 24 are cut to form an ornamental design, such as the fish-shaped design shown in FIGS. 1–6. It will be understood that although a single fish shape is shown in the drawings, the hand towel 10 may have the shape of any desired fish (bass, carp, tuna, shark, etc.). The two layers 22, 24 are joined together by doubling over the edges of the toweling about the periphery of the layers 22, 24 and joining them together by sewing, preferably in two parallel rows of stitching 26 to define a border 28 having the desired ornamental shape, including an edge seam 29, extending about the entire periphery of the body 20 of the towel 10. Thus, the body 20 is flat with two layers 22, 24 in abutting contact joined at the edges 360° about its circumference slidable with respect to each other inside the border 28. The double layer of toweling provides the hand towel 10 with extra thickness and increased absorbency for wiping up moisture.

The loop 30 is made from a flexible, resilient, elastic fabric band or strap. In the first embodiment, shown in FIG. 2, the loop 30 is attached to the body 20 of the towel 10 by being sewn between the edges of the first 22 and second 24 layers into the edge seam 29 on one side of the loop 30. The diametrically opposite side of the loop forms a first free end 32 and a second free end 34 which may be releasably fastened by a button 36. Advantageously, the loop 30 may be secured to a belt A without the necessity for unfastening the belt A, or may be secured to a railing without detaching the railing supports. The elastic band includes a plurality of button holes 38 spaced apart longitudinally along the length of the band so that the size of the loop 30 may be adjusted to accommodate belts, rails, or other supports of varying width or diameter. The elastic or resilient property of the loop 30 enables the loop 30 to withstand a reasonable degree of tensile force applied to the towel 10 without tearing the button 36 loose. The loop 30 may be made from two separate strips of elastic, each having one end sewn into the edge seam 29, or from a single strip of elastic folded in the middle and sewn into the edge seam 29.

Figure 4:
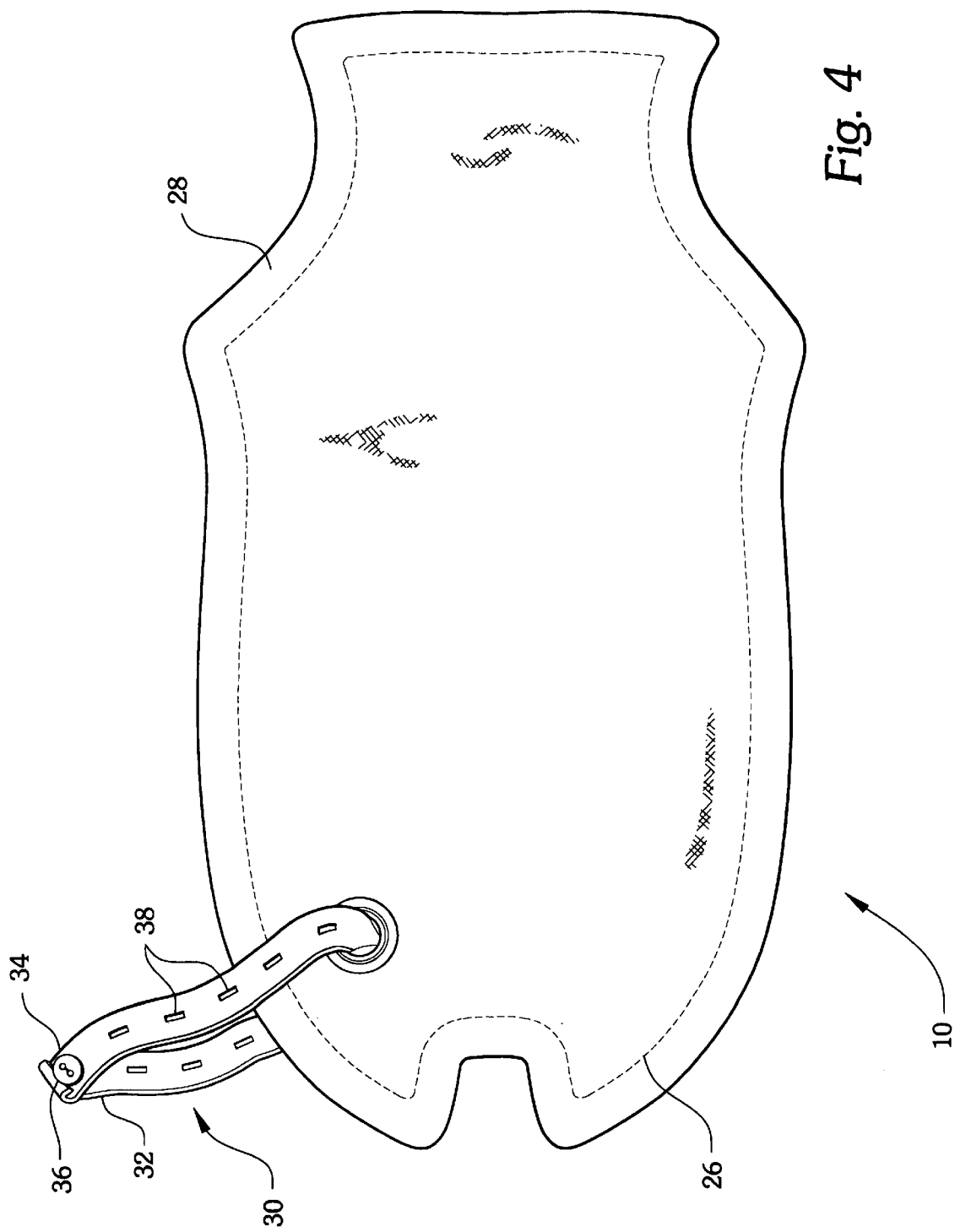
FIG. 4 is a side view of an alternative embodiment of a hand towel according to the present invention.

A second embodiment of the hand towel 10 is shown in FIG. 4. Construction of the body 20 and the loop 30 is the same as in the first embodiment shown in FIGS. 2 and 3, except that the body 20 also includes a grommet 40 defining an opening 42 extending through the two layers 22, 24 of the body 20. In the embodiment shown, the grommet 40 is incorporated into the ornamental design of the hand towel 10 by defining a fish eye. The loop 30 may then be constructed from a single band of elastic having one of the ends, 32 or 34, extending through the opening 42 and being releasably fastened to the other end by the button 36 to define the loop 30.

Figure 5:
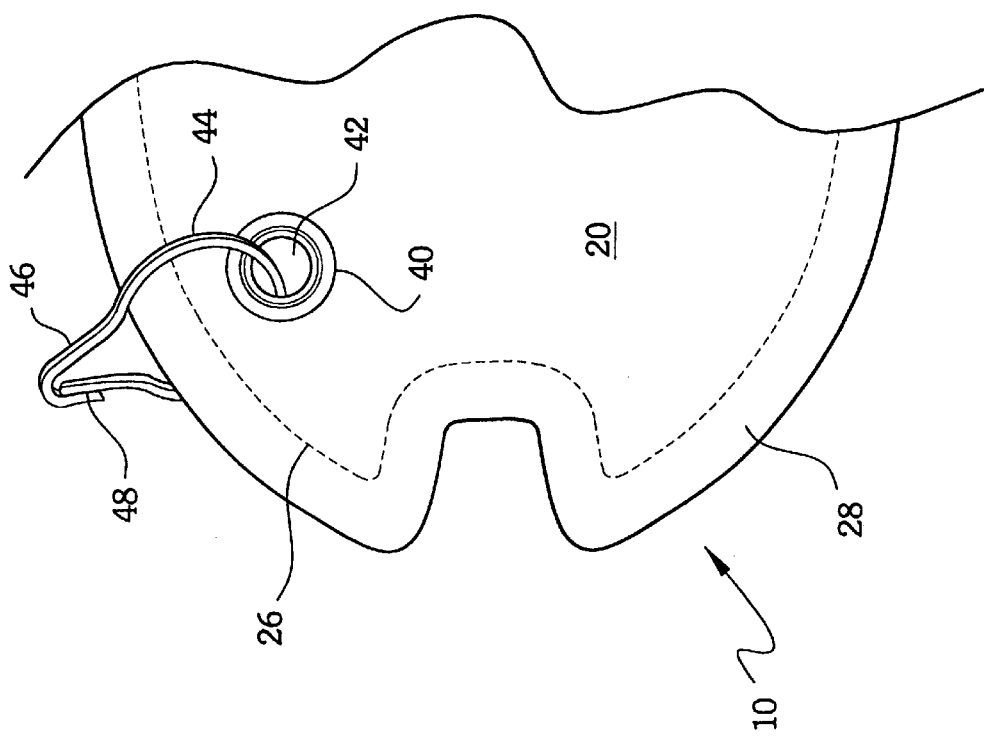
FIG. 5 is a fragmented side view showing a hand towel with a metal ring for attachment to a belt or other support.

As shown in FIG. 5, the second embodiment permits the use of a metal ring 44 in lieu of the elastic loop 30. The ring 44 may include a circular ring with a projection 46 which includes a resilient tang 48 which permits the ring 44 to open for insertion through the opening 42 in the grommet 40 or around a belt A or other flat support.

Figure 6:
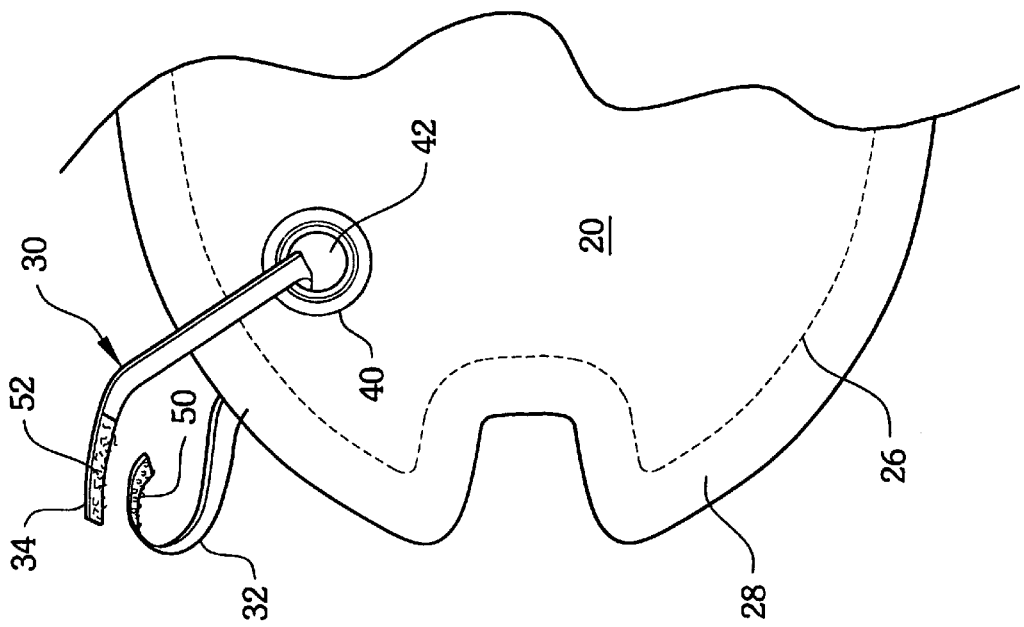
FIG. 6 is a fragmented side view showing a hand towel with a loop releasably fastened with hook and loop material.

As shown in FIG. 6, the elastic band may have alternate fastening means for defining the loop 30. The fastening means may comprise hook and loop fastening material, including a hook portion 50 attached to one end 32 of the loop 30 and loop fastening material 52 attached to the other free end of the loop. The hook and loop fastening means permits quicker attachment of the hand towel 10 to a belt A or other support and some degree of size adjustment, but may make cleaning of the towel 10 more difficult than the button 36 fasteners shown in FIGS. 2 and 4.

The hand towel 10 had its genesis as a device for fishermen to wipe moisture and soil from their hands, and the ornamental fish design is also particularly adapted to conform to the ambiance and motif of seafood restaurants. However, it will be understood that the scope of the current invention is not limited to these applications, nor is the scope of the invention limited to a fish-shaped hand towel 10. Rather, the scope of the claimed invention extends to a hand towel 10 having a double layer of toweling with a border defining any ornamental design and having a releasable attachment means adapted for releasably attaching the towel to a belt, railing or other support, the attachment means preferably being an elastic loop with a releasable fastener and with size adjustment means for adjusting the size of the loop. As so understood, the hand towel 10 of the present invention has a myriad of uses for the sportsmen, as well as a multitude of occupational fields where it may be advantageous to have a towel readily accessible for wiping soil or moisture from the user's hands.

It is to be understood that the present invention is not limited to the embodiments described above, but encompasses any and all embodiments within the scope of the following claims. It will further be understood that the hand towel 10 of the present invention may be made in various sizes and colors.

What is claimed is:

1. A hand towel comprising:
   a) a body formed from a first layer of a flat toweling fabric cut in an ornamental shape and having a first peripheral edge and a second layer of a flat toweling fabric cut in the same ornamental shape and having a second peripheral edge, the first and second peripheral edges being sewn together to define a border including an edge seam 360° about the body;
   b) releasable attachment means for releasably attaching said body of the hand towel to a user's person or to a support accessible to a user, said releasable attachment means comprising at least one flexible, resilient, elongated band made from an elastic fabric, the band having a first free end and a second free end, said at least one band including fastening means for releasably fastening said first end to said second end in order to define a loop; and c) wherein said at least one band comprises a single elongated band folded in the middle, the folded middle of said band being inserted between the first and second peripheral edges of said first and second layers and being sewn into said edge seam.

2. The hand towel according to claim 1, wherein said fastening means comprises hook fastening material attached to the first free end of said band and loop fastening, material attached to the second free end of said band.

3. The hand towel according to claim 1, wherein the first layer and the second layer of said body are made from terry cloth.

4. The hand towel according to claim 1, wherein said body is fish-shaped.

5. The hand towel according to claim 1, further comprising a grommet defining an opening extending through said first layer and said second layer.

6. A hand towel, comprising:

a) a body formed from a first layer of a flat toweling fabric cut in an ornamental shape and having a first peripheral edge and a second layer of a flat toweling fabric cut in the same ornamental shape and having a second peripheral edge, the first and second peripheral edges being sewn together to define a border including an edge seam 360° about the body;

b) releasable attachment means for releasably attaching said body of the hand towel to a user's person or to a support accessible to a user, said releasable attachment means comprising at least one flexible, resilient, elongated band made from an elastic fabric, the band having a first free end and a second free end, said at least one band including fastening means for releasably fastening said first end to said second end in order to define a loop; and c) wherein said fastening means comprises:
  i) a button attached to the first free end of said at least one band; and
  ii) a plurality of button holes defined in the second end of said at least one band, said plurality of button holes being spaced apart longitudinally along the length of said band, whereby the diameter of the loop may be adjusted.

7. The hand towel according to claim 6, wherein said at least one band comprises a first band having a first fixed end and a second band having a second fixed end, the first fixed end and the second fixed end being inserted between the first and second peripheral edges of said first and second layers and being sewn into said edge seam.

8. The hand towel according to claim 6, further comprising a grommet defining an opening extending through said first layer and said second layer, said band extending through the opening defined by said grommet.

9. The hand towel according to claim 6, wherein the first layer and the second layer of said body are made from terry cloth.

10. The hand towel according to claim 6, wherein said body is fish-shaped.

11. The hand towel according to claim 6, further comprising a grommet defining an opening extending through said first layer and said second layer.

* * * * *